United States Patent
Cuttner et al.

(10) Patent No.: US 6,868,372 B2
(45) Date of Patent: Mar. 15, 2005

(54) IMAGE AND AUDIO DEGRADATION SIMULATOR

(75) Inventors: Craig D. Cuttner, Norwalk, CT (US); Robert M. Zitter, Stamford, CT (US)

(73) Assignee: Home Box Office, Inc., New York, NY (US)

( * ) Notice: Subject to any disclaimer, the term of this patent is extended or adjusted under 35 U.S.C. 154(b) by 751 days.

(21) Appl. No.: 09/833,033

(22) Filed: Apr. 11, 2001

(65) Prior Publication Data

US 2002/0032548 A1 Mar. 14, 2002

Related U.S. Application Data

(60) Provisional application No. 60/197,101, filed on Apr. 12, 2000.

(51) Int. Cl.[7] .............................................. G06F 17/10
(52) U.S. Cl. ........................... 703/2; 703/4; 375/240.02
(58) Field of Search ........................ 375/240.02; 703/2, 703/4; 710/5; 725/127; 348/14.07, 176, 185, 188, 441, 575, 584, 588, 707, 722, 738

(56) References Cited

U.S. PATENT DOCUMENTS

| | | | |
|---|---|---|---|
| 2,286,540 A | | 6/1942 | Hanson ....................... 348/722 |
| 3,588,321 A | | 6/1971 | Bruch ......................... 348/575 |
| 4,148,069 A | | 4/1979 | Smiley et al. ............... 348/707 |
| 4,158,208 A | | 6/1979 | Dischert ...................... 348/176 |
| 4,167,022 A | | 9/1979 | Dischert et al. ............. 348/188 |
| 4,205,346 A | | 5/1980 | Ross ........................... 348/584 |
| 4,207,687 A | * | 6/1980 | Haas et al. ................... 434/49 |
| 4,280,285 A | * | 7/1981 | Haas ............................. 434/30 |
| 4,364,080 A | | 12/1982 | Vidovic ...................... 348/185 |
| 5,189,516 A | | 2/1993 | Angell et al. ............... 348/588 |
| 5,418,578 A | | 5/1995 | Culling ....................... 348/738 |
| 5,495,292 A | | 2/1996 | Zhang et al. ........... 375/240.02 |
| 5,724,607 A | | 3/1998 | Brandt .......................... 710/5 |
| 5,760,825 A | | 6/1998 | Grenier .................... 348/14.07 |
| 5,805,202 A | | 9/1998 | Mullins et al. .............. 725/127 |
| 5,999,220 A | | 12/1999 | Washino ..................... 348/441 |

FOREIGN PATENT DOCUMENTS

| | | |
|---|---|---|
| EP | 0 896 483 | 2/1999 |
| EP | 0 924 939 | 6/1999 |
| EP | 0 942 602 | 9/1999 |
| WO | WO 99/50824 | 10/1999 |

OTHER PUBLICATIONS

Matavelli et al., M. Computational Graceful Degradation for Video Sequence Decoding, IEEE, International Conference on Image Processing, vol. 1, Oct. 1997, pp. 330–333.*

(List continued on next page.)

*Primary Examiner*—Russell Frejd
(74) *Attorney, Agent, or Firm*—Fish & Neave LLP; Garry J. Tuma

(57) ABSTRACT

An image and audio degradation simulator simulates in real time selected degradation effects on images and audio of a film or television production. The degradation effects, which can include those incurred after the electronic capture of the production to its display at a final destination, are performed on electrical signals representing pictures and sound. Simulations can be displayed in real time either substantially immediately upon completion of a portion of the production or at any stage thereafter. Such real-time degradation simulations give a producer an opportunity to see and hear what an end-user (e.g., a television viewer or moviegoer) would see and hear, thus allowing the producer to make typically cost-effective production changes (e.g., to lighting, audio, wardrobe, background, etc.) while that production is still in progress.

50 Claims, 4 Drawing Sheets

OTHER PUBLICATIONS

Tobagi et al., F. Performance Evaluation of 10Base–T and 100Base–T Ethernets Carrying Multimedia Traffic, IEEE Transactions on Selected Areas in Communications, vol. 14, No. 7, Sep. 1996,pp. 1436–1454.*

Zhang et al., J. Video Error Concealment Using Decoder Motion Vector Estimation, IEEE, TENCOM '97, Speech and Image Technology for Computing and Telecommunications, vol. 2, Dec. 1997, pp. 777–780.*

Ducksoo et al., L. Sound Field Processor for Creating Virtual Concert Hall Impression in Home, IEEE Transactions on Consumer Electronics, vol. 41, No. 2, May 1995, pp. 273–281.*

* cited by examiner

IMAGE AND AUDIO DEGRADATION SIMULATOR

CROSS REFERENCE TO RELATED APPLICATION

This claims the benefit of U.S. Provisional Application No. 60/197,101, filed Apr. 12, 2000.

BACKGROUND OF THE INVENTION

This invention relates to degradation of electrical signals representing images and audio of film and television productions. More particularly, this invention relates to real-time simulation of such signal degradation.

The visual and audio quality of an original production, which may be a live or animated film or television production, or a live transmission, is rarely what an end-user (e.g., a television viewer or moviegoer) is actually sees or hears. The visual and sound quality of an original production initially may be degraded because of a technical limitation or problem related to the electronic capture of the production. For example, common picture defects can be caused by herringbone clothing, white shirts, venetian window blinds, film grain, and excessively rapid camera motion. Picture and sound quality of the captured images and audio may then be further degraded as a result of post-production processing, video processing, signal transmission, and display at an end-user's location. Post-production processing can involve editing, color correction, film or tape transfers, replays, storage, and duplication. Signal transmission can involve compression and decompression, analog and digital conversions, scrambling and descrambling, and noise and artifacts (i.e., stray entities that do not belong in an image). Display at an end-user's location can involve low quality picture resolution and high levels of audio distortion.

Many of these degradations can be cost-effectively corrected or compensated for by making changes to the production while that production (e.g., a particular scene) is in progress. For example, simple changes to a set (including to background, props, colors, lighting, microphone positions, wardrobe, etc.) can often eliminate the causes or at least lessen the effects of various picture and sound degradations. However, a producer (or director, cinematographer, recording engineer, etc.), who creates the film or video representation of the pictures and sounds of a film or television production, has no way of knowing, and in particular, cannot see or hear the effects of various degradations while a production is in progress. Thus, a producer has no opportunity to make typically cost-effective on-the-spot changes that could compensate for or correct various degradations that will affect the quality of the final product seen and heard by end-users.

Even "dailies," for example, which are film workprints created overnight for review in the morning to ensure that the previous day's scenes were filmed as desired, do not give a producer the opportunity to make immediate changes while those scenes are being filmed. At best, needed corrections usually involve re-assembling the cast and crew and re-shooting the scene on the next available day. Dailies are intended to be reviewed primarily for scene content and gross technical problems (e.g., inaudible dialog) while a cast, crew, and set are still available. Because dailies are unedited and unprocessed (e.g., no color correction), they are not of the same quality as that intended to be displayed to an end-user. Moreover, dailies are not intended to show the effects of subsequent degradations that are likely to occur. Thus, dailies are of limited value for making corrections and enhancements that would improve or maintain a desired level of picture and sound quality to be seen and heard by end-users.

Similarly, although other picture and sound quality reviews are typically conducted before the film or videotape leaves a production facility, those reviews usually occur after completion of most filming or taping. Moreover, they also do not take into account any subsequent degradations that are likely to occur after the finished product leaves the production facility for distribution to theater or television operators. Again, little or no opportunity exists to correct or compensate for degradations while film or television productions are in progress.

The same is true of known automated equipment and processes that operate reactively to correct various types of detected degradations (e.g., transmission errors, distortions, and other quality related problems). These corrections are responsive to degradations that have already occurred and are not normally responsive to subsequent degradations that are likely to occur. Furthermore, correcting or compensating for some types of degradations may be less complex and costly had they been anticipated and acted upon while a production was in progress.

In view of the foregoing, it would be desirable to be able to provide a degradation simulation of a just-completed portion of a film or television production that can be viewed substantially simultaneously while that production is in progress.

It would also be desirable to be able to provide a variety of selectable degradation simulations of a just-completed portion of a film or television production that can be viewed substantially simultaneously while that production is in progress.

It would further be desirable to be able to provide a quantitative analysis of a degradation simulation of a just-completed portion of a film or television production that can be reviewed substantially simultaneously while that production is in progress.

It would still further be desirable to be able to provide a degradation simulation that highlights unacceptable degradations of a just-completed portion of a film or television production that can be viewed substantially simultaneously while that production is in progress.

SUMMARY OF THE INVENTION

It is an object of this invention to provide a degradation simulation of a just-completed portion of a film or television production that can be viewed substantially simultaneously while that production is in progress.

It is also an object of this invention to provide a variety of selectable degradation simulations of a just-completed portion of a film or television production that can be viewed substantially simultaneously while that production is in progress.

It is a further object of this invention to provide a quantitative analysis of a degradation simulation of a just-completed portion of a film or television production that can be reviewed substantially simultaneously while that production is in progress.

It is a still further object of this invention to provide a degradation simulation that highlights unacceptable degradations of a just-completed portion of a film or television production that can be viewed substantially simultaneously while that production is in progress.

In accordance with this invention, an image and audio degradation simulator is provided that includes a digital signal processor, a memory, at least one algorithm that performs a predetermined degradation on a received image or audio signal, and a display that displays images, audio, or both. The simulator simulates on the display in real time the image, audio, or both of a received signal that has been degraded in accordance with the degradation algorithm. Thus, for example, a producer can view a degradation simulation preferably substantially immediately while producing a scene to determine whether any re-shooting or production changes are needed to maintain a desired level of picture or sound quality.

The degradation simulator of the present invention preferably includes a plurality of selectable degradation algorithms, each performing a different predetermined degradation. Each algorithm can be simulated individually or in combination with others. The simulator also preferably performs recursive degradations of a selected algorithm. This allows a producer to simulate, for example, the effects of multiple signal compressions and decompressions on a video signal.

Preferably, the degradation simulator of the present invention also performs a quantitative analysis of simulated degradations to provide one or more degradation measurements that can be reviewed substantially simultaneously with production. The degradation simulator also preferably highlights on the display in real time portions of a simulation in which one or more degradations exceed a preset threshold.

Advantageously, the present invention can be used at any stage of production to simulate and evaluate the effects of degradations subsequent to that stage.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention provides an image and audio degradation simulator that simulates in real time how images and audio would respectively look and sound after the electrical signals representing those images and audio have been degraded in one or more objective or subjective ways. In accordance with the present invention, degradation simulations are provided preferably substantially immediately upon receiving signals representing images and audio. Producers of film or television programming can advantageously simulate preferably one or more types of degradation on, for example, a just-completed filmed or taped scene or portion thereof to determine in real time whether any retakes or production changes are necessary—while that scene is still in progress. Similarly, producers of live transmissions can simulate how those transmissions are being received by end-users and accordingly make any necessary production changes. Thus, a desired level of picture or sound quality can be maintained.

Moreover, the degradation simulator of the present invention can be advantageously used at any stage of a production process (e.g., from creation to display at an end-user's location) to simulate the effects of any known subsequent degradations or any "what-if" degradations. For example, the present invention can be used with existing tapes and films to simulate the effects of a particular transmission path to an end-user. Thus, the quality of a particular link (e.g., a rental fiber circuit) that may be used for a live event can be simulated and evaluated. Similarly, producers can use the invention to simulate and evaluate a potential distributor's transmission plant before agreeing to use that distributor.

The present invention does not require that both images and audio be present concurrently, each can be degraded and simulated separately, if desired. Also, the present invention is not limited to images of a moving picture, but can also be used with still images. Furthermore, the present invention performs no correction of actual or anticipated degradations, but identifies their effects via displayed simulations and optional quantitative analyses.

Where the context permits, "displaying" includes displaying images, playing audio, or both, and "picture" includes images displayed on a movie screen, a television monitor, computer screen, or the like.

Figure 1:
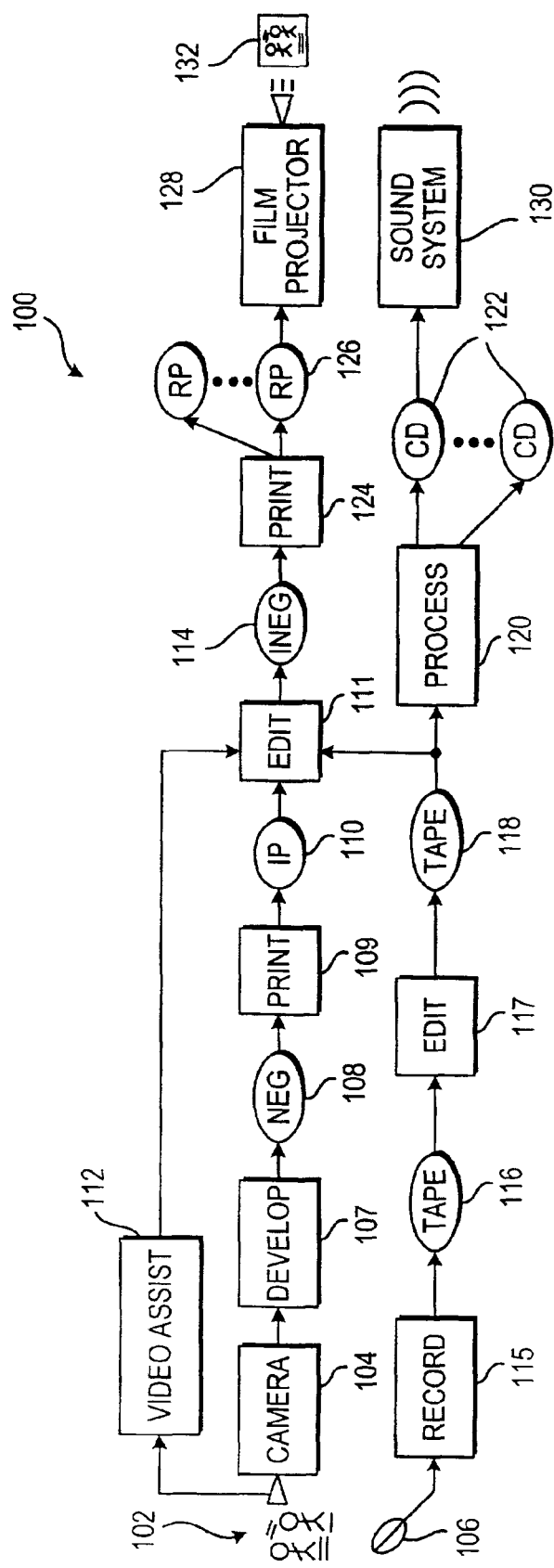
FIG. 1 is a simplified illustration of a representative film production process from creation to moviegoer.

FIG. 1 illustrates a representative film production process from creation to moviegoer. "Film" refers to motion pictures that are initially shown in theaters. Film production process 100 begins with the filming of a scene 102 with one or more film cameras 104 and microphones 106. Output from camera 104 is developed into a negative 108. Negative 108 is then used to print an "interpositive" 110. An interpositive is a high quality copy of an original negative, but with positive images, and is used mostly in film labs. Interpositive 110 is then edited and processed (e.g., different scenes and different camera angles of scenes are added, sequenced, and cut; color correction is performed; special effects, titles, and credits are added; etc.). A "video assist" 112 (i.e., a film camera optical takeoff) is often used by producers and others to assist in make editing decisions. Video assist 112 is a device that provides images seen through the lens of film camera 104, similar to that seen through the eyepiece of a camera. The edited interpositive is then printed to form an "internegative" 114. An internegative is a color negative of a color transparency made for purposes of duplication.

Audio from the filmed scene is typically recorded on audio tape 116, and then edited and mixed to produce a final sound track tape 118. Editing and mixing 117 can include adding audio received from different microphones, dubbing inaudible portions, and adding background sounds. The final sound track is then usually etched onto internegative 114 and copied onto, for example, multiple compact discs (CDs) 122. The sound track may be formatted in SDDS (Sony Dynamic Digital Sound).

Multiple release prints 126 are then printed from internegative 114 and are typically distributed physically along with CDs 122 to theater operators. At a theater, release print 126 and CD 122 are respectively run through a film projector 128 and sound system 130 where pictures on screen 132 and sound are ultimately seen and heard by moviegoers.

Degradation of images and audio can occur throughout process 100. For example, degradation can occur at video assist 112, printing 109, editing 111, printing 124, audio editing and mixing 117, audio CD processing 120, film projector 128, sound system 130, and screen 132.

Figure 2:
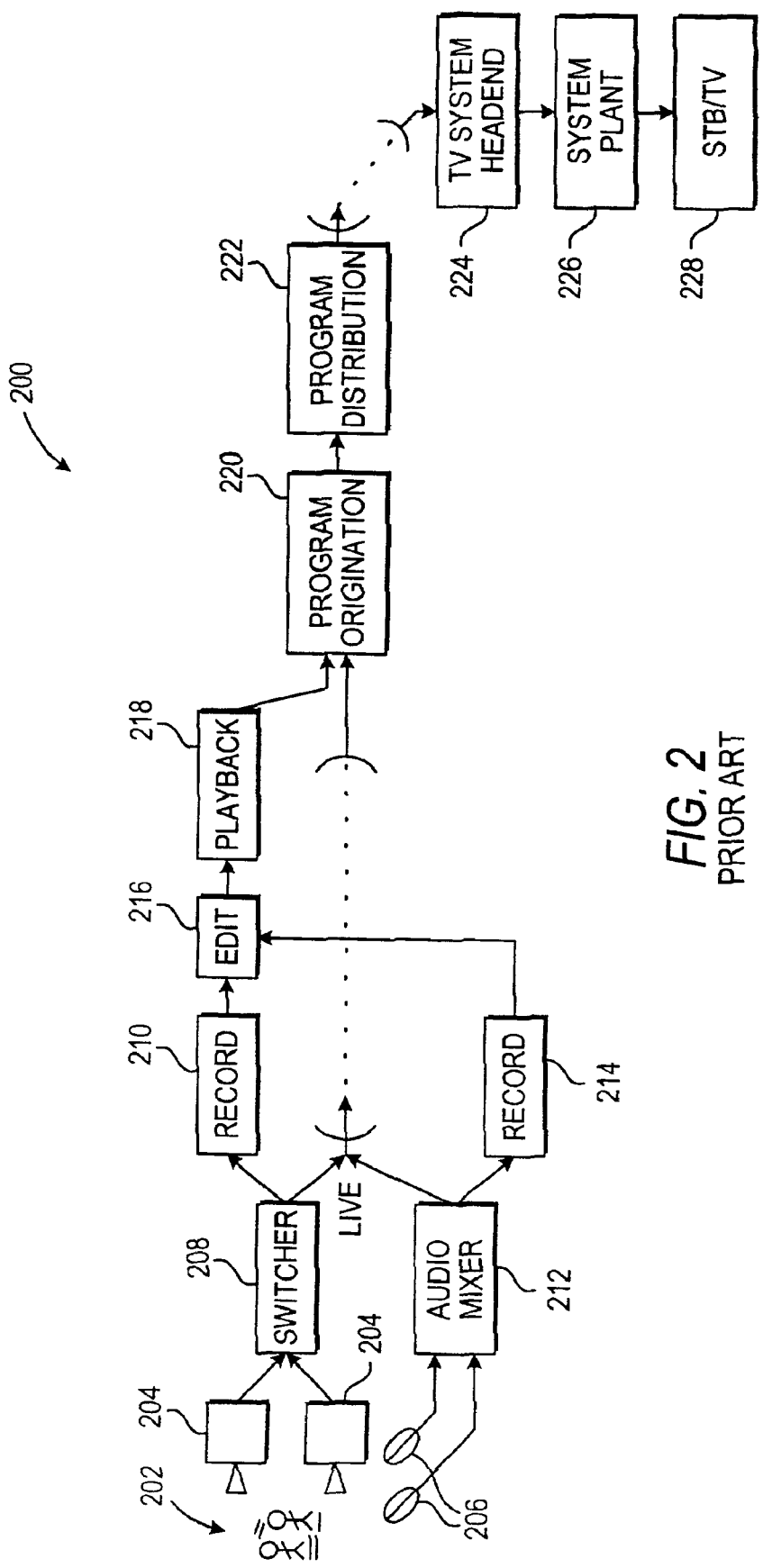
FIG. 2 is a simplified illustration of a representative television production process from creation to television viewer.

FIG. 2 illustrates a representative television production process from creation to television viewer. Television productions may be videotaped or live transmissions. Television production process 200 begins with the electronic capture of an event 202 with one or more television cameras 204 and microphones 206. A production switcher 208 controlled by an operator selects which camera output is transmitted or recorded. Similarly, an audio mixer 212 is used to select and mix the audio to be transmitted or recorded. For videotaping, separate tapes are usually made of the video and audio, both of which are then typically edited, assembled, and processed at 216 into a single production tape of the complete program. This tape is then played back in a videotape player 218 which feeds a typically automated program origination switcher 220. Switcher 220 integrates and assembles programming received from multiple sources to create the complete programming for a network or channel. Switcher 220 outputs the network or channel's complete programming to a program distribution facility 222. From there, either tapes of the programming are physically transported to various cable or satellite TV system headends 224, or the programming is transmitted to TV system headends 224 via satellite, the Internet, cable (e.g., coax or fiber optic), or any other suitable medium. During such transmission, programming is typically digitized, compressed, and possibly scrambled. From headend 224, the program is transmitted through the system plant 226 to one or more set-top boxes or televisions 228 where the final product can be seen and heard by television viewers.

The live transmission path is very similar, except that instead of creating a tape that is edited and played back in a videotape player, the electrical signals output from production switcher 208 and audio mixer 212 are transmitted directly to program origination switcher 220 via satellite, cable (e.g., coax or fiber optic), the Internet, or any other suitable medium.

Similar to process 100, degradation of electrical signals representing images and audio of a television production can occur at any stage. For example, degradation can occur at cameras 204, switcher 208, editing 216, playback 218, program origination switcher 220, program distribution 222, TV system headend 224, system plant 226, and set-top box/television 228.

Hybrid film/television processes that include elements of both processes 100 and 200 are also common. For example, film productions can sometimes be produced less expensively by following process 200 up to playback 218 where, instead of feeding the output of playback 218 into program origination switcher 220, the output of playback 218 is used to create an internegative 114. Similarly, when films are to be shown on television, the film's internegative 114 is processed with a "telecine" device that transfers film to videotape. That videotape is then played at playback 218 and fed into program origination switcher 220. Each of these hybrid processes incurs the same types of signal degradations as processes 100 and 200.

Although some degradation in picture and sound quality between an original production and what end-users see and hear is expected and usually imperceptible, objectionable undetected degradations can and do occur, reaching as far as the end-user. These degradations often can be corrected or compensated for had they been known or anticipated during production.

Figure 3:
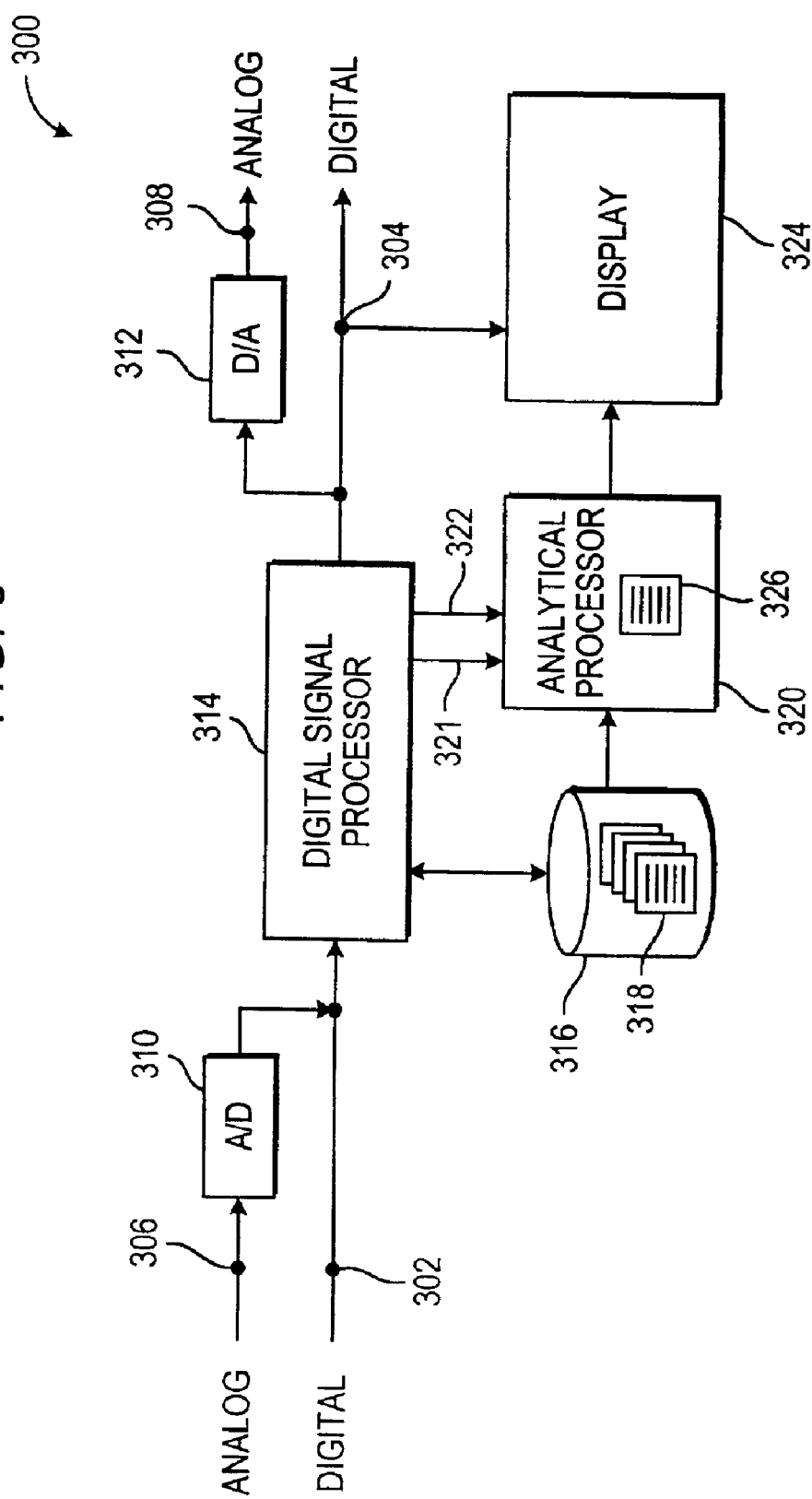
FIG. 3 is a block diagram of a preferred embodiment of a degradation simulator according to the invention.

FIG. 3 shows a preferred embodiment of an image and audio degradation simulator 300 in accordance with the present invention. Simulator 300 includes input 302 and output 304, and preferably includes input 306 and output 308. Input 302 receives digital signals, while input 306 receives analog signals. These signals represent images and audio of preferably film, television, or hybrid productions. Output 304 provides a degraded digital signal, while output 308 provides a degraded analog signal. Preferably, simulator 300 includes a conventional analog-to-digital (A/D) converter 310 for converting analog input signals to digital signals, and a conventional digital-to-analog (D/A) converter 312 for converting digital output signals to analog signals. The analog output signals can be used for subsequent processing, recording, or quality control logging.

Input signal sources to simulator 300 can include, for example, video assist devices, film transfers (e.g., "dailies," interpositives, internegatives, and release prints), video camera sources and production switchers, (e.g., high-quality video and RGB (red-green-blue)), microphones, audio mixing console, and analog sources (e.g., cable headend transmissions or receptions and satellite or cable (e.g., coax or fiber optic) transmissions or receptions). Digital signals received at input 302 are preferably in a serial digital component format, such as, for example, Serial Data Interconnect (SDI). SDI includes both digital video and embedded audio. Alternatively, where only analog picture, sound, or both are available, those signals can be coupled to input 306 for conversion into digital form by analog-to-digital converter 310.

Simulator 300 also includes a digital signal processor (DSP) 314, which can be a personal computer. DSP 314 includes a central processing unit (CPU) and preferably includes a RAM-storage video device, such as, for example, a ViewStore 6000 by Viewgraphics Incorporated, which has been acquired by Optibase, Inc., of San Jose, Calif. This device provides both a frame-buffering function and access to the CPU. The CPU performs algorithmic functions on the received image and audio signals. DSP 314 preferably includes a Pentium® III processor by Intel Corporation, of Santa Clara, Calif., or equivalent.

Simulator 300 further includes a memory 316 of preferably 128 megabytes. Although shown separately (primarily for illustrative purposes), memory 316 can be incorporated within DSP 314 and is preferably random access memory. Memory 316 can additionally include, or can alternatively be, other types of suitable memory such as EEPROM, EPROM, disk, or tape. Digital signals received by DSP 314 are stored in memory 316.

Simulator 300 includes at least one and preferably a plurality of signal degradation algorithms 318 that can be stored in memory 316 or other suitable memory or storage coupled to DSP 314. Each algorithm 318 performs a predetermined signal degradation on a received digital signal. Algorithms 318 preferably perform both objective and subjective signal degradations. Preferably, they include the following types of film degradations: picture resolution loss (of preferably various degrees), "gate weave," and "shutter judder." Algorithms 318 preferably perform the following types of television film degradations: three-two pulldown motion artifacts; NTSC (National Television Standards Committee) "cross-chroma, reduced color gamut, cross-luma, and interlace 'twitter;'" PAL (phase alternate line) "speed variation (audio) and interlace 'twitter.'" NTSC is a North American broadcast standard specifying, among other things, 525 lines in each complete video frame. PAL is a European color TV standard specifying, among other things, 625 lines in each complete video frame. Algorithms 318 also preferably perform the following types of television video degradations: NTSC/PAL artifacts as mentioned above, satellite FM/triangular noise spectrum and IF (intermediate frequency) truncation, analog-to-digital conversion, digital-to-analog conversion, VSB-AM (vestigial sideband—amplitude modulation) television transmission artifacts, MPEG (Moving Pictures Expert Group) signal compressions (of various bit rates and other parameters such as 4:2:2/4:2:0), cable television "cascade, 'triple-beat,' and 'composite second-order distortion.'" Algorithms 318 further preferably perform the following types of audio degradations: analog-to-digital conversion, noise reduction, sub-band coding and compression artifacts, and digital-to-analog conversion.

Algorithms 318 preferably include DSP digital filtering taps and memory operations that operate on the received image and audio signals. Simulator 300 can execute algorithms 318 individually, recursively, or in combination with each other, as selected by a user. Memory 316 preferably includes lookup tables for algorithms 318 to facilitate their loading and execution.

Alternatively, in another embodiment of simulator 300 in accordance with the present invention, the degradation functions performed by algorithms 318 can be performed instead by dedicated hardware in DSP 314.

Simulator 300 preferably includes an optional analytical processor 320 coupled to outputs 321 and 322 of DSP 314. Output 321 provides a digital signal received by DSP 314 before any degradations are performed on it, while output 322 provides that digital signal degraded in accordance with one or more selected algorithms 318. Analytical processor 320 analyzes received signals to provide objective measurements of the encountered signal degradation. Analytical processor 320 preferably includes a picture quality analyzer, such as, for example, a Model PQA300 by Tektronix, Inc., of Beaverton, Oreg. Picture degradation measurements preferably include signal-to-noise ratios and frequency responses. Analytical processor 320 also preferably includes an audio analyzer, such as, for example, a System One or System Two series audio analyzer by Audio Precision, also of Beaverton, Oregon. An audio analyzer provides an equivalent set of objective degradation measurements. These degradation measurements are displayable on a display. Alternatively or additionally, analytical processor 320 may include its own display for displaying degradation measurements.

Simulator 300 includes display 324, which can be, for example, a 14" Model BVM-D14H1A or 20" Model BVM20E1A broadcast monitor by Sony Corporation of America, of New York, N.Y. Display 324 preferably displays the following types of outputs: picture and sound as degraded by one or more selectable algorithms 318, showing what the degradations incurred along a particular film, television, or hybrid production path would do to a picture or sound track; analytical measurements of degradations incurred along a selected production path including, for example, "depth of degradation" (e.g., percent of defect), signal-to-noise ratio, root sum square (RSS) of accumulated degradations (e.g., ANSI/EIA RS-250 accumulations); and an enhanced display including, for example, a display with "zebra stripes" highlighting a particular defect (e.g., a venetian blinds picture defect).

Figure 4:
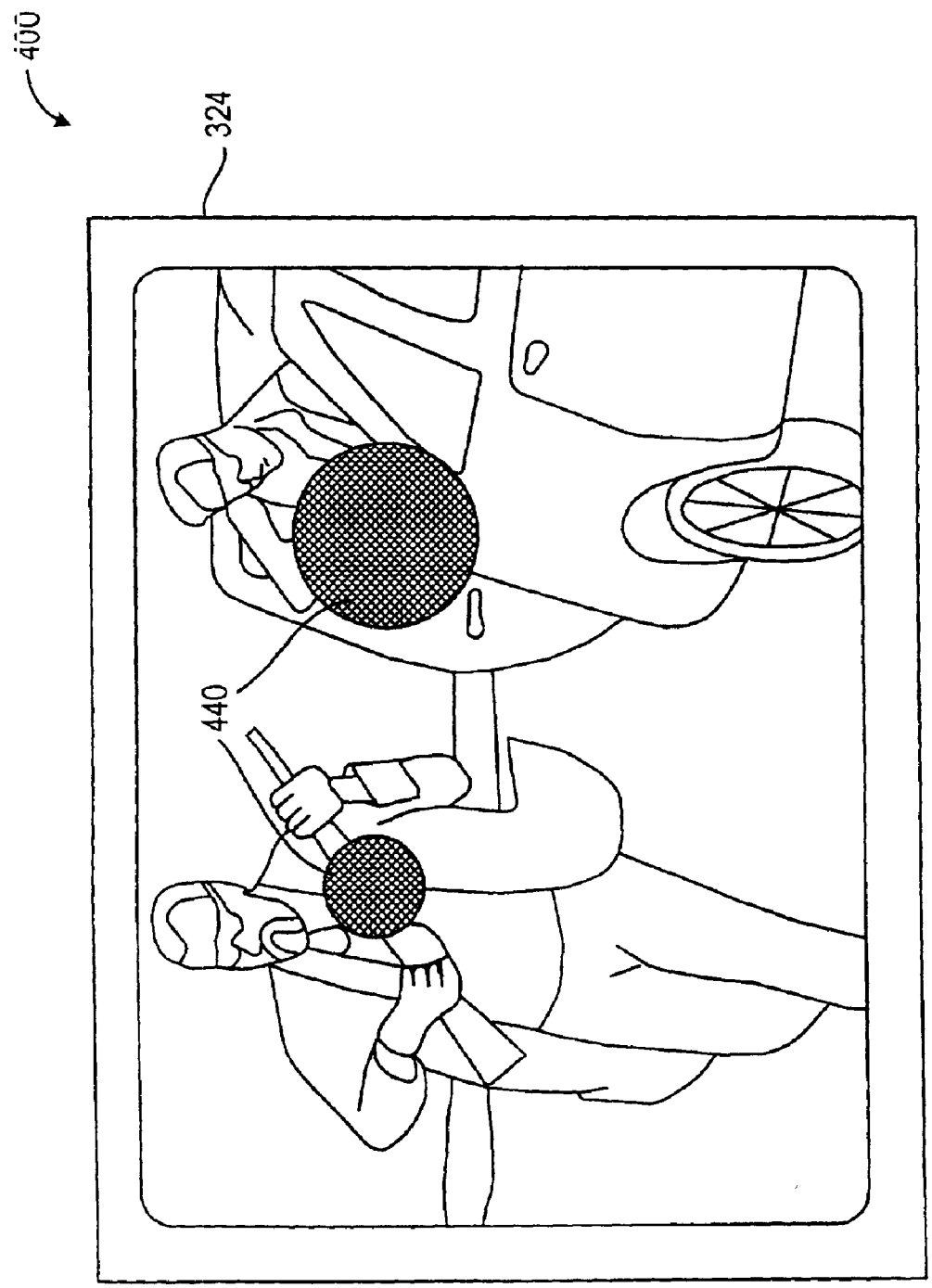
FIG. 4 is a simplified illustration of a display screen with highlighted portions indicating unacceptable degradation according to the invention.

Analytical processor 320 preferably executes software 326 that preferably uses degradations measurements and preset thresholds to provide highlighting (e.g., brightened, crosshatched, or colored areas) superimposed over portions of a display where degradation (e.g., a signal-to-noise ratio related to a picture defect) exceeds a preset threshold. For example, software 326 may provide crosshatching superimposed over a displayed portion of rapid camera motion when the picture complexity exceeds the ability of the data-rate-constrained MPEG compression decoder to faithfully reproduce the picture above a preset subjective threshold set by a system operator (e.g., the producer). To illustrate, FIG. 4 shows display 324 in which portions of a degradation simulation of a recorded or filmed scene are highlighted with crosshatching 440, indicating that the degradations in those areas exceed a preset threshold.

Described below are particular details of a simulation by simulator 300 of degradation resulting from a single pass of MPEG digital video compression and MPEG Layer 3 audio compression (e.g., MUSICAM). The simulation assumes a signal representing images and audio being transmitted via a digital cable-TV path to a typical set-top box that includes a consumer NTSC interface using VSB analog modulation at channel 3 to a consumer-type display (e.g., a conventional television screen).

For MPEG video degradation, an algorithm 318 preferably includes a discrete cosine transform (DCT) to show the impacts of the imperfect frequency reproductions in the early stages of MPEG compression processing. Real-time inputs to algorithm 318 include the likely target MPEG bit rate and picture resolution of the transmitted picture. Other algorithms 318 (or one that performs all mentioned degradations) are also executed to simulate the MPEG decoder (e.g., filter characteristics such as group-delay), NTSC conversion (e.g., band-limited chroma, cross-color, etc.), VSB modulation (e.g., pre-shoots, filter ringing, etc.), and the consumer display (e.g., resolution impacts of screen dot-pitch, display phosphors, etc.).

Similarly, received audio signals are processed by one or more algorithms 318 that include filter tap points and filter characteristics for simulating what would be incurred in the audio sub-band companded processor (e.g., MUSICAM). Companding refers to signal compression and expansion. Real-time data inputs provide algorithms 318 with the data rate and version of the MUSICAM encoder and decoder to be simulated. Additional algorithms 318 can also be selected, preferably with a graphical user interface (GUI) preferably included in simulator 300, to include loudspeaker fidelity, amplifier distortion, or other gross or subtle degradations. The GUI permits a 'chain' of algorithms 318 to be executed for simulating different types of degradations that may be incurred along a process path (including recursive executions of particular algorithms 318 that can simulate, for example, the effects of multiple passes of MPEG encoding, A/D and D/A conversions, etc.).

Algorithms 318 preferably perform the following degradations on received signals:

Video degradations:

MPEG-2 encoding (version: Motorola DigiCipher, TSP version 7);

Target bit rate: 2–6 Mb/sec, variable bit rate, statistical multiplexing, medium load;

resolution: 3/4;

target transmission path: cable TV digital QAM (quadrature amplitude modulation), BER (bit error rate)$>10^{-4}$;

target decoder: cable set top box, Motorola DCT-1000; and display: consumer TV grade dot pitch, NTSC compatible via channel 3 modulator.

Audio degradations:
  MPEG Layer 3 audio compression (version: MUSICAM; Philips version 2.0);
  Target bit rate: 128 kb/sec, network congestion: light; and
  Speaker: consumer grade 5-inch or smaller loudspeaker; 2% THD (distortion).

In a continuous stream, the digital video and audio degraded in accordance with selected algorithms 318 are provided at output 304 for display on display 324 and preferably at output 322 for quantitative analysis at analytical processor 320, as described above.

Thus it is seen that an image and audio degradation simulator is presented that simulates in real time selected degradations of images and sound of film, television, or hybrid productions either while those productions are being electronically captured or at anytime thereafter. One skilled in the art will appreciate that the present invention can be practiced by other than the described embodiments, which are presented for purposes of illustration and not of limitation, and the present invention is limited only by the claims which follow.

What is claimed is:

1. An image and audio signal degradation simulator comprising:
   a digital signal processor comprising an input, a central processing unit, and an output, said signal processor operative to receive at said input a digital signal, said digital signal representing at least one of an image and audio;
   a memory coupled to said signal processor;
   at least one algorithm stored in said memory, said algorithm performing a predetermined signal degradation on said received digital signal; and
   a display coupled to said signal processor and operative to display at least one of an image and audio represented by said digital signal degraded in accordance with said algorithm and received from said signal processor.

2. The simulator of claim 1 wherein said memory comprises random access memory.

3. The simulator of claim 1 wherein said signal processor degrades said digital signal in accordance with said algorithm and said display displays said degraded signal received from said signal processor in real time upon said signal processor's receipt of said digital signal.

4. The simulator of claim 1 wherein said signal processor degrades said digital signal in accordance with said algorithm and said display displays said degraded signal received from said signal processor substantially immediately upon said signal processor's receipt of said digital signal.

5. The simulator of claim 1 further comprising an analog-to-digital converter coupled to said input of said signal processor.

6. The simulator of claim 1 further comprising a digital-to-analog converter coupled to said output of said signal processor.

7. The simulator of claim 1 wherein said algorithm degrades said digital signal in accordance with MPEG video compression effects.

8. The simulator of claim 1 wherein said algorithm degrades said digital signal in accordance with cable transmission effects.

9. The simulator of claim 1 wherein said algorithm degrades said digital signal in accordance with a level of audio speaker distortion.

10. The simulator of claim 1 wherein said algorithm comprises a plurality of algorithms, each said algorithm performing a different predetermined signal degradation.

11. The simulator of claim 1 further comprising a graphical user interface to facilitate selection of said algorithm.

12. The simulator of claim 1 further comprising a lookup table to facilitate loading of said algorithm.

13. The simulator of claim 1 wherein said digital signal conforms to a Serial Data Interconnect standard.

14. An image and audio signal degradation simulator comprising:
   a digital signal processor comprising an input, a central processing unit, and an output, said signal processor operative to receive at said input a digital signal, said digital signal representing at least one of an image and audio;
   a memory coupled to said signal processor;
   at least one algorithm stored in said memory, said algorithm performing a predetermined signal degradation on said received digital signal;
   a display coupled to said signal processor and operative to display at least one of an image and audio represented by said digital signal degraded in accordance with said algorithm and received from said signal processor; and
   a second processor coupled to said signal processor, said second processor operative to perform quantitative analysis and provide degradation measurements of a digital signal received from said signal processor.

15. The simulator of claim 14 wherein said second processor comprises a picture quality analyzer.

16. The simulator of claim 14 wherein said second processor comprises an audio quality analyzer.

17. The simulator of claim 14 wherein said display displays degradation measurements received from said second processor.

18. The simulator of claim 14 wherein said degradation measurements include a signal-to-noise ratio.

19. The simulator of claim 14 wherein said degradation measurements include a frequency response.

20. The simulator of claim 14 further comprising software that uses said degradation measurements to highlight portions of said displayed degraded signal where signal degradation exceeds a predefined threshold.

21. The simulator of claim 14 wherein:
   said signal processor degrades said digital signal in accordance with said algorithm and said display displays said degraded signal received from said signal processor in real time upon said signal processor's receipt of said digital signal.

22. The simulator of claim 14 wherein:
   said display displays highlighting superimposed over a displayed portion of said degraded signal that exceeds a predefined threshold.

23. An image and audio signal degradation simulator comprising:
   a digital signal processor comprising an input, a central processing unit, and an output, said signal processor operative to receive at said input a digital signal, said digital signal representing at least one of an image and audio;
   a memory coupled to said signal processor;
   at least one algorithm stored in said memory, said algorithm performing a predetermined signal degradation on said received digital signal;
   a display coupled to said signal processor and operative to display at least one of an image and audio represented by said digital signal degraded in accordance with said algorithm and received from said signal processor; and software that causes said display to display highlighting over displayed portions of said degraded signal where signal degradation exceeds a predefined threshold.

24. The simulator of claim 23 wherein said highlighting comprises crosshatching.

25. An image and audio signal degradation simulator comprising:
 a digital signal processor comprising an input, a central processing unit, and an output, said signal processor operative to receive at said input a digital signal, said digital signal representing at least one of an image and audio;
 a memory coupled to said signal processor;
 at least one algorithm stored in said memory, said algorithm performing a predetermined signal degradation on said received digital signal; and
 a display coupled to said signal processor and operative to display at least one of an image and audio represented by said digital signal degraded in accordance with said algorithm and received from said signal processor; wherein:
 said signal processor degrades said digital signal in accordance with said algorithm and said display displays said degraded signal received from said signal processor in real time upon said signal processor's receipt of said digital signal.

26. A method of simulating degraded image and audio signals, said method comprising:
 receiving a signal representing at least one of an image and audio;
 receiving a selection of at least one algorithm, said algorithm performing a predetermined degradation on said received signal;
 processing said received signal in accordance with said algorithm to produce a degraded signal; and
 displaying on a display at least one of an image and audio represented by said degraded signal; wherein:
 said processing and said displaying occur in real time upon said receiving a selection.

27. The method of claim 26 further comprising:
 receiving an analog signal;
 converting said analog signal to said digital signal.

28. The method of claim 26 further comprising:
 outputting said degraded signal;
 converting said outputted degraded signal to an analog signal.

29. The method of claim 26 further comprising:
 analyzing degradations of said degraded signal;
 providing degradation measurements of said degraded signal in accordance with said analyzing.

30. The method of claim 29 wherein said analyzing comprises analyzing visual quality of an image represented by said degraded signal.

31. The method of claim 29 wherein said analyzing comprises analyzing audio quality of a sound represented by said degraded signal.

32. The method of claim 29 wherein said providing comprises displaying said degradation measurements on a display.

33. The method of claim 29 wherein said degradation measurements include a signal-to-noise ratio.

34. The method of claim 29 wherein said degradation measurements include a frequency response.

35. The method of claim 29 wherein said degradation measurements include a color quality measurement of an image represented by said degraded signal.

36. The method of claim 26 wherein said displaying comprises:
 displaying on a display an image represented by said degraded signal;
 highlighting portions of said displayed image where said degraded signal exceeds a preset degradation threshold.

37. The method of claim 26 wherein said received signal conforms to a Serial Data Interconnect standard.

38. The method of claim 26 wherein said algorithm performs signal degradation in accordance with MPEG video compression effects.

39. The method of claim 26 wherein said algorithm performs signal degradation in accordance with MPEG layer 3 audio compression effects.

40. The method of claim 26 wherein said algorithm performs signal degradation in accordance with cable transmission effects.

41. The method of claim 26 wherein said algorithm performs signal degradation in accordance with a level of audio speaker distortion.

42. The method of claim 26 wherein said algorithm includes a discrete cosine transform.

43. The method of claim 26 wherein said processing and said displaying occur substantially simultaneously upon said receiving a signal.

44. The method of claim 26 wherein said processing and said displaying occur substantially simultaneously upon said receiving a selection.

45. The method of claim 26 wherein said processing and said displaying occur in real time upon said receiving a signal.

46. The method of claim 26 wherein said receiving a selection comprises receiving a selection of a plurality of algorithms, each said algorithm performing a different predetermined signal degradation.

47. A method of simulating degraded image and audio signals, said method comprising:
 receiving a signal representing at least one of an image and audio;
 receiving a selection of at least one algorithm, said algorithm performing a predetermined degradation of said received signal;
 processing said received signal in accordance with said algorithm to produce a degraded signal;
 analyzing degradations of said degraded signal;
 providing degradation measurements of said degraded signal in accordance with said analyzing; and
 displaying on a display at least one of an image and audio represented by said degraded signal.

48. A method of simulating degraded image and audio signals, said method comprising:
 receiving a signal representing at least one of an image and audio;
 receiving a selection of at least one algorithm, said algorithm performing a predetermined degradation on said received signal;
 processing said received signal in accordance with said algorithm to produce a degraded signal;
 displaying on a display at least one of an image and audio represented by said degraded signal; and
 highlighting on said display a portion of said displayed degraded signal that exceeds a preset degradation threshold.

49. An image and audio signal degradation simulator comprising:

memory means for storing a received digital signal, said digital signal representing at least one of an image and audio;

degradation means for performing a predetermined signal degradation on said received digital signal; and display means for displaying at least one of an image and audio represented by said digital signal degraded in accordance with said degradation means.

50. An image and audio signal degradation simulator comprising:

means for receiving a signal representing at least one of an image and audio;

means for receiving a selection of at least one algorithm, said algorithm performing a predetermined degradation on said received signal;

means for processing said received signal in accordance with said algorithm to produce a degraded signal; and means for displaying on a display at least one of an image and audio represented by said degraded signal; wherein:

said means for processing and for displaying operate in real time upon receipt of a signal and a selection by said respective means for receiving.

\* \* \* \* \*